United States Patent
Taverner

(10) Patent No.: US 11,391,645 B2
(45) Date of Patent: Jul. 19, 2022

(54) BIREFRINGENT MULTI-PEAK OPTICAL REFERENCE ELEMENT AND BIREFRINGENT SENSOR SYSTEM

(71) Applicant: Weatherford Technology Holdings, LLC, Houston, TX (US)

(72) Inventor: Domino Taverner, Bethany, CT (US)

(73) Assignee: Weatherford Technology Holdings, LLC, Houston, TX (US)

(*) Notice: Subject to any disclaimer, the term of this patent is extended or adjusted under 35 U.S.C. 154(b) by 103 days.

(21) Appl. No.: 16/268,029

(22) Filed: Feb. 5, 2019

(65) Prior Publication Data

US 2019/0170609 A1 Jun. 6, 2019

Related U.S. Application Data

(63) Continuation of application No. 14/994,257, filed on Jan. 13, 2016, now Pat. No. 10,254,198.

(60) Provisional application No. 62/105,304, filed on Jan. 20, 2015.

(51) Int. Cl.
  *G01M 11/00* (2006.01)
  *G01D 5/353* (2006.01)
  *G02B 6/02* (2006.01)
  *G02B 6/036* (2006.01)

(52) U.S. Cl.
  CPC ....... *G01M 11/333* (2013.01); *G01D 5/35303* (2013.01); *G01D 5/35316* (2013.01); *G02B 6/02109* (2013.01); *G02B 6/02371* (2013.01); *G02B 6/03694* (2013.01)

(58) Field of Classification Search
  CPC .......... G01D 5/35303; G01D 5/35316; G01M 11/333; G02B 6/02109; G02B 6/02371; G02B 6/03694
  See application file for complete search history.

(56) References Cited

U.S. PATENT DOCUMENTS

| | | | |
|---|---|---|---|
| 5,349,811 A * | 9/1994 | Stickler | F02C 9/28 60/734 |
| 5,399,854 A | 3/1995 | Dunphy et al. | |
| 5,513,913 A * | 5/1996 | Ball | G01D 5/35383 250/227.14 |
| 5,689,578 A | 11/1997 | Yamauchi et al. | |
| 5,828,059 A | 10/1998 | Udd | |

(Continued)

OTHER PUBLICATIONS

Ibsen, M. et al., "Sinc-Sampled Fiber Bragg Gratings for Identical Multiple Wavelength Operation," IEEE Photonics Technology Letters, vol. 10, No. Jun. 6, 1998, pp. 842-843.

(Continued)

*Primary Examiner* — Violeta A Prieto
(74) *Attorney, Agent, or Firm* — Patterson + Sheridan, LLP

(57) ABSTRACT

Certain aspects of the present disclosure generally relate to an optical reference element having a wavelength spectrum comprising a plurality of wavelength functions having wavelength peaks spaced over a range of wavelengths, wherein adjacent wavelength functions are due to two orthogonal birefringence axes in the optical reference element. Aspects of the present disclosure may eliminate the drift issues associated with residual polarization and polarization dependent loss (PDL) with respect to grating-based sensor and reference element measurements.

22 Claims, 5 Drawing Sheets

(56) References Cited

U.S. PATENT DOCUMENTS

| | | | |
|---|---|---|---|
| 5,844,927 A * | 12/1998 | Kringlebotn | G01F 1/383 372/6 |
| 6,115,526 A | 9/2000 | Morse | |
| 6,788,418 B1 | 9/2004 | Kringlebotn | |
| 6,888,125 B2 * | 5/2005 | Ronnekleiv | G01D 5/35303 250/227.19 |
| 6,931,188 B2 | 8/2005 | Kersey et al. | |
| 7,111,676 B2 | 9/2006 | Drzewiecki | |
| 7,173,696 B2 | 2/2007 | Taverner et al. | |
| 7,653,269 B1 | 1/2010 | Fisher | |
| 9,465,137 B2 * | 10/2016 | Lagace | G01L 9/0077 |
| 10,254,198 B2 * | 4/2019 | Taverner | G01M 11/333 |
| 10,557,963 B2 * | 2/2020 | Lagace | G01K 11/32 |
| 10,724,922 B1 * | 7/2020 | Yao | G02B 6/024 |
| 2003/0142319 A1 | 7/2003 | Ronnekleiv et al. | |
| 2005/0269489 A1 * | 12/2005 | Taverner | G01J 9/02 250/227.14 |
| 2010/0158433 A1 * | 6/2010 | Askins | G01D 5/35316 385/13 |
| 2011/0103757 A1 | 5/2011 | Alkemper et al. | |
| 2011/0249973 A1 | 10/2011 | Donlagic et al. | |
| 2012/0234101 A1 | 9/2012 | Vigneaux | |
| 2012/0281205 A1 * | 11/2012 | Askins | G01M 11/3181 356/73.1 |
| 2013/0314940 A1 | 11/2013 | Russert | |
| 2014/0340235 A1 * | 11/2014 | Taverner | G01D 5/35354 340/855.3 |
| 2015/0369731 A1 * | 12/2015 | Taverner | G01D 5/3539 356/445 |
| 2016/0033360 A1 | 2/2016 | Taverner | |
| 2016/0209295 A1 * | 7/2016 | Taverner | G02B 6/03694 |

OTHER PUBLICATIONS

International Search Report and Written Opinion dated Apr. 4, 2016, corresponding to International Application No. PCT/US2016/013779.

J. Kvavle, et al., "Low loss elliptical core D-fiber to PANDA fiber fusion splicing," Opt. Express16, 13552-13559 (2008).

J. Noda et al., "Polarization-maintaining fibers and their applications," Aug. 1986, Journal of Lightware Technology vol. 4 Issue: 8.

* cited by examiner

BIREFRINGENT MULTI-PEAK OPTICAL REFERENCE ELEMENT AND BIREFRINGENT SENSOR SYSTEM

CLAIM OF PRIORITY UNDER 35 U.S.C. § 119

This application is a continuation of U.S. patent application Ser. No. 14/994,257, filed Jan. 13, 2016, which claims benefit of U.S. Provisional Patent Application Ser. No. 62/105,304, filed Jan. 20, 2015 and entitled "BIREFRINGENT MULTI-PEAK OPTICAL REFERENCE ELEMENT AND BIREFRINGENT SENSOR SYSTEM," which are both herein incorporated by reference in their entireties.

BACKGROUND

Field of the Disclosure

Aspects of the disclosure relate generally to an optical sensing system and, more particularly, to using a birefringent multi-peak optical reference element in an optical sensing system.

Description of the Related Art

Birefringent optical fibers for sensing parameters such as pressure are known in the art. In a birefringent fiber, birefringence is typically caused by the geometrical asymmetry or by anisotropic stress affecting the propagating modes of the fiber. Typical fiber sensors, such as those made from standard optical communication fibers, have outer diameters in the range of 125 microns with optical cores of 7 to 12 microns.

A large diameter waveguide, having an outer diameter ranging from about 0.3 mm to 4 mm, can provide several advantages for use as an optical sensor. Large diameter optical waveguides have a core and a cladding, as do standard fibers. In fact, the core of a single mode large diameter optical waveguide is generally the same diameter as the core of a single mode standard fiber, typically 7 to 12 microns. However, large diameter optical waveguides are thicker and sturdier than standard fiber because of the substantial amount of cladding in the large diameter optical waveguides. For example, while a standard fiber typically has a diameter of 125 microns, large diameter optical waveguides range from 0.3 mm to about 4 mm in diameter, which mostly constitutes cladding. The relatively thick cladding of large diameter optical waveguides provides significant mechanical benefits over standard fiber. In addition, a large diameter optical waveguide does not require a protective buffer layer and, thus, reduces manufacturing complexity. A large diameter optical waveguide may also be referred to as a "cane" or "cane waveguide," due to the higher rigidity of large diameter optical waveguides as compared to standard fiber.

For sensing applications, optical waveguides may include one or more Bragg gratings. A fiber Bragg grating (FBG) is an optical element that is usually formed by photo-induced periodic modulation of the refractive index of an optical fiber's core. An FBG element is highly reflective to light having wavelengths within a narrow bandwidth that is centered at a wavelength referred to as the Bragg wavelength (also known as the characteristic wavelength, $\lambda_o$). Other wavelengths of the light pass through the FBG element without reflection. The Bragg wavelength depends on characteristics of the optical fiber itself, as well as on physical parameters (e.g., temperature and strain) that affect the optical period of the grating. Changes in the Bragg wavelength due to the physical parameters will result in changes in the wavelengths being reflected by the FBG element. Therefore, FBG elements can be used as sensors to measure such parameters. After proper calibration, the Bragg wavelength provides an absolute measure of the physical parameters.

In practice, the Bragg wavelength(s) of one or more FBG elements are often measured by sweeping light across a wavelength range (i.e., a bandwidth) that includes all of the possible Bragg wavelengths for the FBG elements and by measuring the power (intensity) of the reflected light over time. While FBG elements are highly useful sensors, an example application may entail measuring the Bragg wavelength with a resolution, repeatability, and accuracy of about 1 picometer (pm) or better. For a Bragg wavelength of 1.55 microns ($\mu$m), a measured shift of 1 pm in the Bragg wavelength corresponds to a change in temperature of approximately 0.1° C. Because of the desired accuracy of the Bragg wavelength determination, some type of reference wavelength measurement system may be included. Making the problem of determining Bragg wavelength more difficult is the fact that the measurement system is typically sensitive to gradients, ripples, and optical polarization in the filtered light source spectrum that can induce small wavelength shifts in the measured peak wavelengths. This leads to uncertainties in the measured Bragg wavelength.

FBG sensor systems may include a wavelength reference system to assist determining the Bragg wavelengths. Such reference systems may be based on a fixed cavity length interference filter, typically a fixed Fabry-Perot wavelength filter, and at least one reference FBG element. When the wavelength swept light is input to the fixed cavity length interference filter, the filter outputs a pulse train that represents the fringes/peaks of the optical transmission or of the reflection spectrum of the filter (e.g., a comb spectrum having constant frequency spacing). This wavelength reference system reduces problems associated with non-linearity, drift, and hysteresis. The reference FBG element can be used for identification of one of the individual interference filter comb peaks, which is then used as the wavelength reference, or for relative wavelength measurements between FBG sensor elements and the reference FBG element. Thus, the comb spectrum establishes a frequency/wavelength scale.

By calibrating both the comb peak wavelength spacing of the reference-fixed Fabry-Perot wavelength filter and the peak wavelength of the reference FBG element versus temperature, and by accurately measuring the temperatures of the Fabry-Perot wavelength filter and of the reference FBG element, the Bragg wavelengths of the FBG sensors can be accurately determined. Alternatively, the temperatures of the fixed Fabry-Perot wavelength filter and of the reference FBG can be stabilized using an oven or an ice bath, for example.

SUMMARY

The systems, methods, and devices of the disclosure each have several aspects, no single one of which is solely responsible for its desirable attributes. Without limiting the scope of this disclosure, some features will now be discussed briefly. After considering this discussion, and particularly after reading the section entitled "Detailed Description," one will understand how the features of this disclosure provide advantages that include eliminating the drift issues associated with residual polarization and polarization dependent loss (PDL) with respect to grating-based sensor and reference element measurements.

Aspects of the present disclosure generally relate to an optical sensing system and, more particularly, to using a birefringent multi-peak optical reference element in an optical sensing system.

Certain aspects of the present disclosure provide an optical reference element having a wavelength spectrum comprising a plurality of wavelength functions having wavelength peaks spaced over a range of wavelengths, wherein adjacent wavelength functions are due to two orthogonal birefringence axes in the optical reference element.

Certain aspects of the present disclosure provide an optical wavelength measurement system. The optical wavelength measurement generally includes an optical source for producing light swept over a range of wavelengths; one or more optical sensing elements, each having a characteristic wavelength within the range of wavelengths; an optical reference element configured to produce a plurality of wavelength functions having wavelength peaks spaced over at least a portion of the range of wavelengths, wherein adjacent wavelength functions are due to two orthogonal birefringence axes in the optical reference element; a sensing detector for converting light received from the optical sensing elements into a sensor electrical signal; a reference detector for converting light received from the optical reference element into a reference electrical signal; and a processing system configured to determine the characteristic wavelengths of the optical sensing elements based on the sensor electrical signal and the reference electrical signal.

Certain aspects of the present disclosure provide a method for determining characteristic wavelengths of one or more optical sensing elements. The method generally includes sweeping light over a range of wavelengths; introducing a first portion of the wavelength-swept light to the optical sensing elements, each having a characteristic wavelength within the range of wavelengths; introducing a second portion of the wavelength-swept light to an optical reference element to produce a plurality of wavelength functions having wavelength peaks spaced over at least a portion of the range of wavelengths, wherein adjacent wavelength functions are due to two orthogonal birefringence axes in the optical reference element; converting light received from the optical sensing elements into a sensor electrical signal; converting light received from the optical reference element into a reference electrical signal; and determining the characteristic wavelengths of the optical sensing elements based on the sensor electrical signal and the reference electrical signal.

Certain aspects of the present disclosure provide an apparatus for determining characteristic wavelengths of one or more optical sensing elements. The apparatus generally includes means for sweeping light over a range of wavelengths; means for introducing a first portion of the wavelength-swept light to the optical sensing elements, each having a characteristic wavelength within the range of wavelengths; means for introducing a second portion of the wavelength-swept light to an optical reference element to produce a plurality of wavelength functions having wavelength peaks spaced over at least a portion of the range of wavelengths, wherein adjacent wavelength functions are due to two orthogonal birefringence axes in the optical reference element; means for converting light received from the optical sensing elements into a sensor electrical signal; means for converting light received from the optical reference element into a reference electrical signal; and means for determining the characteristic wavelengths of the optical sensing elements based on the sensor electrical signal and the reference electrical signal.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only typical aspects of this disclosure and are therefore not to be considered limiting of its scope, for the disclosure may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. The detailed description and drawings are merely illustrative of the disclosure rather than limiting, the scope of the disclosure being defined by the appended claims and equivalents thereof.

Aspects of the present disclosure provide techniques and apparatus for determining characteristic wavelengths of one or more optical sensing elements by providing a sweep of light over a range of wavelengths to an optical reference element. The optical reference element may produce a plurality of wavelength functions having wavelength peaks spaced over at least a portion of the range of wavelengths. Adjacent wavelength functions may be due to two orthogonal birefringence axes in the optical reference element. Certain aspects of the present disclosure may be implemented with a large diameter optical waveguide.

Example Birefringent Optical Waveguide

Figure 1:
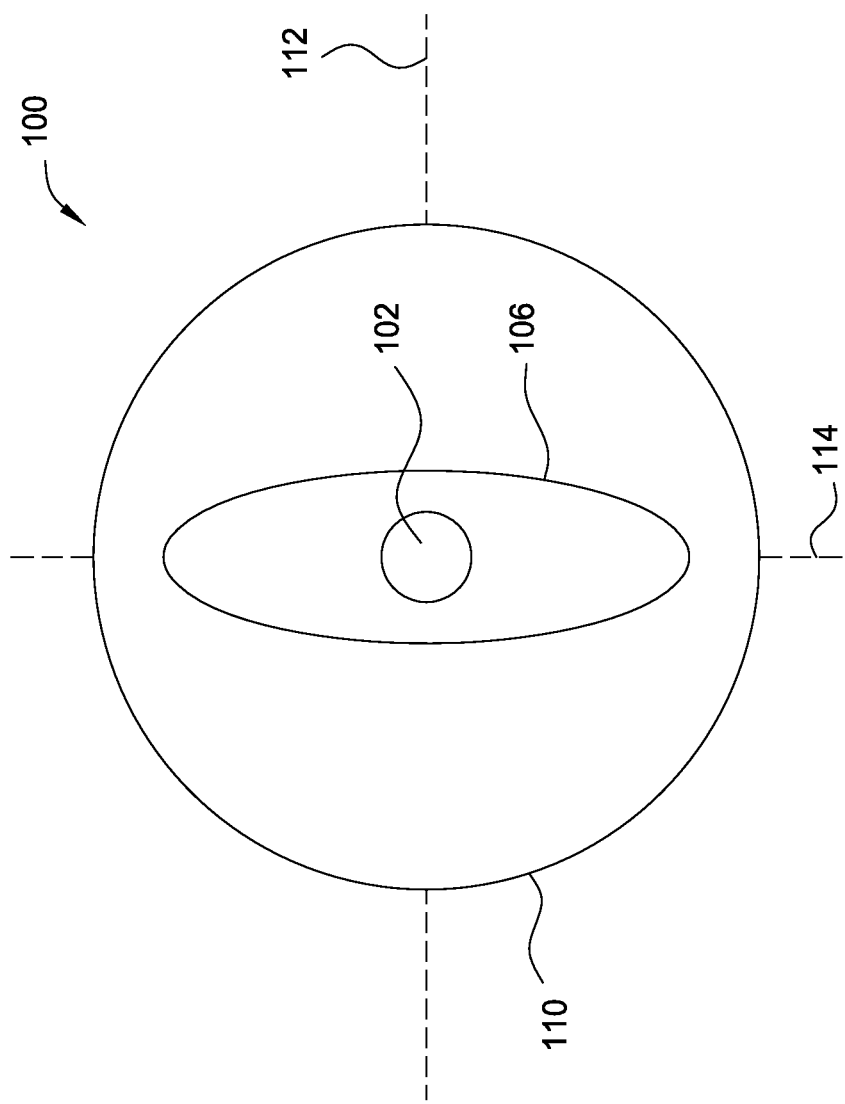
FIG. 1 is a cross-sectional view of an example birefringent optical waveguide.

FIG. 1 illustrates an end view of an example birefringent optical waveguide 100 defined by a core 102 that is surrounded by an inner cladding 106 having a substantially elliptical shape. The elliptical inner cladding 106 may place a stress on the core 102 that is greater in a first axis 112 than in a second axis 114, thus creating birefringence by impacting the index of refraction of the core 102 by a greater amount in the first axis 112 than the second axis 114. The inner cladding 106 may be surrounded by an outer cladding 110. With this configuration, the birefringent optical waveguide 100 may reflect light at a first polarization axis 112 and a second polarization axis 114.

Swept wavelength Bragg grating interrogators (BGIs) typically employ a stable wavelength reference and sensor elements that provide one or more spectral peaks which can be referenced in order to obtain wavelength measurements. The peaks should be stable (or at least characterizable with repeatability) over time and for different environment and input conditions.

Bragg gratings in optical waveguides have been used as sensors due to their stability (if annealed suitably) and highly characterizable performance under temperature variations. For example, a BGI instrument may use a Bragg grating in a large diameter optical waveguide in the sensor receiver channel to act as a reference point from which the wavelengths of other detected peaks may be calculated using a Fabry-Perot comb filter in a second receiver channel as a ruler.

One of the limiting factors to the stability of a Bragg grating element measurement is the birefringence of the grating waveguide interacting with variation in the polarization state of the interrogating light. Although Bragg gratings are typically written into low-birefringence fiber, there may still be some small level of birefringence that can become significant in a very stable Bragg grating interrogator. Birefringence causes the Bragg grating peak wavelength to be slightly different on each polarization axis of the fiber, so any variation in the source polarization may cause a shift in the measured peak wavelength. Even "depolarized" optical sources may have some residual polarization, and other optical system components may add some level of polarization dependent loss (PDL) such that the source polarization state can evolve over time and with varying environmental conditions, leading to drift in the measured peak wavelengths.

Figure 2:
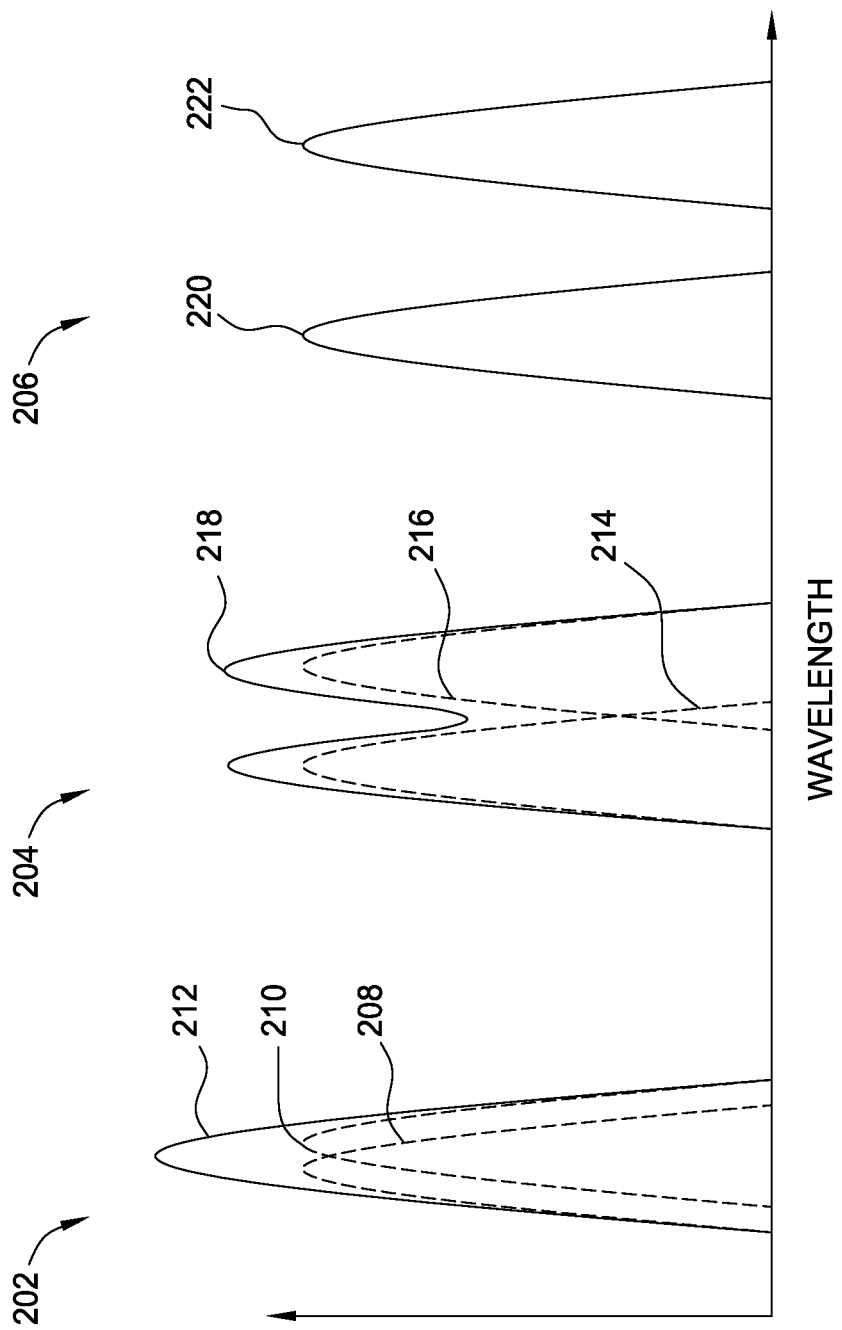
FIG. 2 provides graphs illustrating spectral peaks of a birefringent optical waveguide having different amounts of birefringence, in accordance with certain aspects of the present disclosure.

Certain aspects of the present disclosure provide a highly birefringent waveguide element in which any Bragg grating written into the waveguide element produces distinct spectral peaks attributed to each birefringence axis. The graph 202 of FIG. 2 illustrates an example spectral peak measurement of a birefringent optical waveguide having low birefringence. As illustrated, the spectral peak measurement 208 from a first polarization axis 112 may be indistinguishable from a spectral peak measurement 210 of a second polarization axis 114. Therefore, the resultant measurement (a combination of the first and second axes measurements) may have a spectral peak 212 that is between the spectral peak measurement 208 of the first polarization axis 112 and the spectral peak measurement 210 of the second polarization axis 114. The graph 204 of FIG. 2 illustrates an example spectral peak measurement of a birefringent optical waveguide having higher birefringence than the optical waveguide represented in graph 202. The spectral peak measurement 214 of the first polarization axis 112 may overlap with a measurement of a spectral peak measurement 216 from the second polarization axis 114. Therefore, the resultant measurement may be a spectral peak measurement 218 having two overlapping, but distinguishable peaks as shown. The graph 206 of FIG. 2 illustrates spectral peak measurements of an optical waveguide having high birefringence where the spectral peak measurement 220 from the first axis 112 may be separated from a spectral peak measurement 222 from the second axis 114 (e.g., the edges of the spectral peak measurements 220, 222 do not overlap).

The wavelengths of the peaks attributable to each polarization axis may be measured. The peak wavelength of each polarization axis may be less dependent on the input state of the light polarization than the peak wavelength in a case (e.g., as illustrated in graph 202 of FIG. 2) where the individual peaks are overlapping such that only one peak is discernable. When the birefringence of the waveguide is such that the peaks overlap on their edges (e.g., as illustrated in graph 204 of FIG. 2) there may be some dependence on the input polarization state, although the dependence is reduced compared to the low-birefringence case where individual peaks are not discernable. When the birefringence of the waveguide is suitably high such that there is no significant overlap of the peak edges, the measured peak wavelength may be entirely independent of the input light polarization state.

Although the measured wavelengths may have reduced dependence on the input state of the light with higher birefringence, the amplitude of each peak can vary significantly depending on the degree of polarization of the light and the angle of the polarization at the grating. A typical application may use a substantially depolarized source that, together with highly birefringent grating sensing elements, may reduce any residual polarization or PDL effect from the measurement. However, applications can be envisaged where the source of light is highly polarized and the polarization angle at the grating is controlled (e.g., by launching on a particular birefringence axis of the fiber) to achieve the desired effect.

Figure 3:
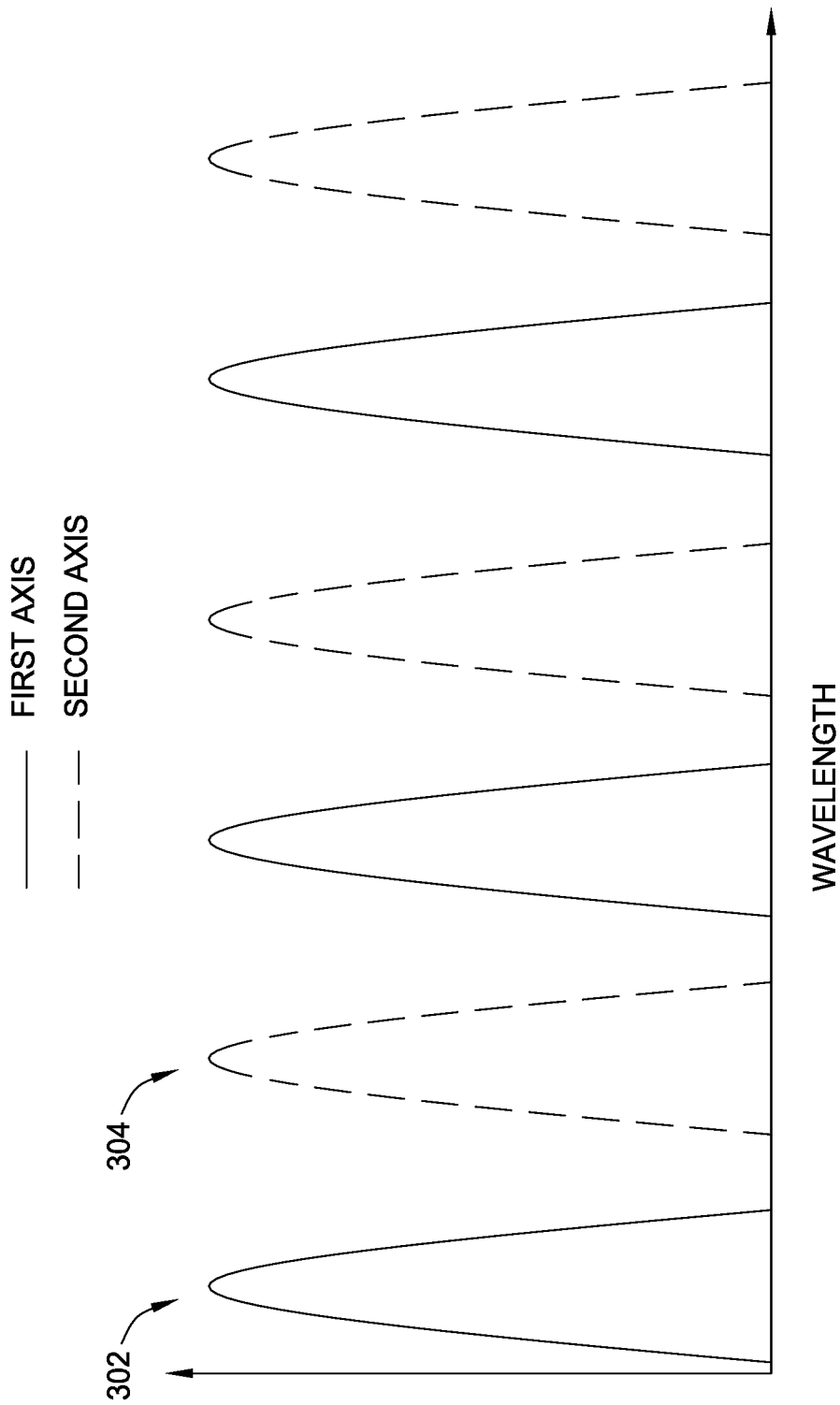
FIG. 3 is a graph illustrating spectral peaks of a highly birefringent multi-peak optical element having separate peaks due to two orthogonal birefringent axes, in accordance with certain aspects of the present disclosure.

In the case of a multi-peak grating (e.g., in the low birefringence case), the peaks may be spaced at regular intervals (e.g., 1 nm). In the present disclosure, as illustrated in FIG. 3, the birefringence of the optical waveguide may be chosen such that the resulting wavelength separation (e.g., between spectral peak 302 and spectral peak 304) due to birefringence matches that of an equivalent low-birefringence grating with indistinguishable polarization peaks. For example, a Bragg grating may be written to have twice the typical period of the equivalent low-birefringence grating, resulting in a reflection spectrum having peaks at the same wavelength spacing as the low-birefringence grating. However, adjacent peaks (e.g., spectral peaks 302 and 304) may be due to alternating birefringence axes in the highly birefringent waveguide. Therefore, the measured peak wavelengths may be independent of the polarization state of the input light.

One example of a multi-peak reference grating is a super-structured Bragg grating. A super-structured Bragg grating is a Bragg grating with a complex structure that may include modulation of the amplitude, period, and/or phase of the refractive index (in the core 102 of the optical waveguide) on length scales greater than the underlying Bragg period. One example of a complex refractive index profile is the periodic sinc modulation of the refractive index profile in FBGs described in Ibsen, M. et al., "Sinc-Sampled Fiber Bragg Gratings for Identical Multiple Wavelength Operation," *IEEE Photonics Technology Letters*, Vol. 10, No. 6, June 1998, pp. 842-843, herein incorporated by reference in its entirety.

Example Sensor System Using a Birefringent Multi-Peak Grating as an Optical Reference Element One example application for a highly birefringent multi-peak grating may be in a Bragg grating interrogator as a wavelength reference element using a multi-peak grating to span the sweep range of a tunable filter and an amplified spontaneous emission (ASE) source (or swept tunable laser). In this application, the highly birefringent multi-peak grating may provide a reference that is stable against source polarization changes and PDL in components.

Figure 4:
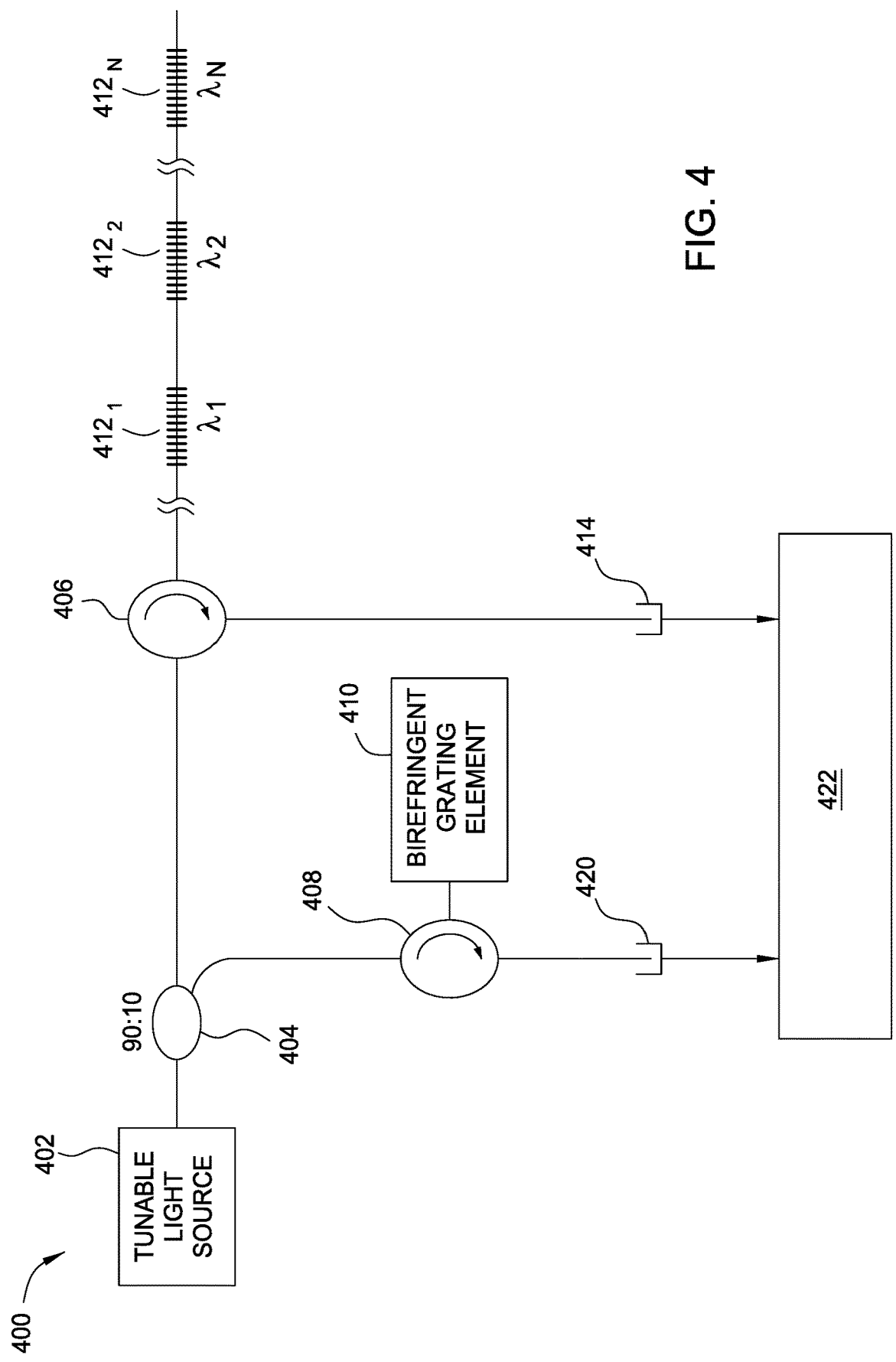
FIG. 4 is a birefringent grating sensor system in accordance with certain aspects of the present disclosure.

For example, FIG. 4 illustrates a Bragg grating interrogation system 400 that utilizes a highly birefringent multi-peak grating as an optical reference element. A similar interrogation system is described in commonly owned U.S. patent application Ser. No. 14/446,543 to Taverner, entitled "Multi-Peak Reference Grating" and filed Jul. 30, 2014, herein incorporated by reference in its entirety. The interrogation system 400 may include a wavelength-swept light source 402 (e.g., tunable light source) that outputs narrow bandwidth light that may be scanned (e.g., swept) across a range of wavelengths. The range of wavelengths may most likely cover at least the Bragg wavelengths of the optical sensing elements 412. For some aspects, the light source 402 may be a tunable laser capable of emitting light swept over the desired range of wavelengths.

The narrow bandwidth scanning light produced by the light source 402 may be split by a fiber optic directional coupler 404 (e.g., an optical splitter). The directional coupler 404 may use any of various suitable ratios for splitting the input light. A first portion (e.g., 90% in a 90:10 splitter) of the light may be optically coupled to a plurality of optical sensing elements 412 via a first optical circulator 406. The optical sensing elements 412 may comprise birefringent Bragg gratings that interact with light at multiple wavelengths and multiple polarizations of light. Example birefringent sensing elements are described in commonly owned U.S. Pat. No. 6,931,188 to Kersey et al., issued Aug. 16, 2005 and entitled "Side-Hole Cane Waveguide Sensor," herein incorporated by reference in its entirety. Although only three optical sensing elements ($412_1$, $412_2$, and $412_N$) are shown, the sensing array may include any suitable number of wavelength-division multiplexed (WDM'ed) and/or time-division multiplexed (TDM'ed) sensing elements for a given application. The optical sensing elements 412 may comprise gratings written in optical fiber and/or large diameter optical waveguides.

Light reflections from the optical sensing elements 412—which occur when the wavelength of the narrow bandwidth scanning light sweeps across the Bragg wavelength of a sensing element 412—pass back into the first optical circulator 406 and to the sensor receiver 414, which may be a photodetector, for example. The sensor receiver 414 may convert the Bragg wavelength reflections into sensor electrical signals having amplitudes that depend on the power (intensity) of the reflected light.

A second portion (e.g., 10% in a 90:10 splitter) of the light from the light source 402 may be directed by the directional coupler 404 into a reference branch for the system 400. As illustrated, the reference branch may have a second optical circulator 408 and a highly birefringent multi-peak grating reference element 410. The interrogation of the reference branch may occur concurrently with the interrogation of the sensing branch having the optical sensing elements 412. Wavelength-swept light directed into the second optical circulator 408 may be input into and reflected by the birefringent grating element 410 to produce an optical reference spectrum that has multiple reference wavelength peaks. Adjacent peaks in the optical reference spectrum may be due to alternating birefringence axes in the birefringent grating element 410. Light reflected from the birefringent grating element 410 may then be directed by the second optical circulator 408 to the reference receiver 420 (e.g., a photodetector), which may convert the optical reference spectrum into a reference electrical signal.

The sensor electrical signal from the sensor receiver 414 and the reference electrical signal from the reference receiver 420 may be sampled, processed, and compared in a signal processing unit 422 (e.g., one or more processors) to determine the characteristic wavelengths of the optical sensing elements 412. The signal processing unit 422 may process each peak in the sensor electrical pulse to determine its absolute characteristic wavelength. For example, the signal processing unit 422 may compare each peak in the electrical pulse train of the electrical signal from the sensor receiver 414 to the peaks in the electrical pulse train of the reference electrical signal from the reference receiver 420. The relative time of the sensor peak between neighboring reference peaks may be used to determine a time value (which may be expressed as a ratio) for the sensor peak. This determination may be made based on a ratio if the wavelength sweep is linear or on a best-fit analysis (e.g., regression) if the wavelength sweep is nonlinear. By measuring the environmental operating conditions of the birefringent grating element 410 during the sweep, the absolute wavelengths of the neighboring reference peaks may be calculated. Then, the time value for the sensor peak and the absolute wavelengths of the neighboring reference peaks may be used to accurately calculate the absolute wavelength of the sensor peak.

A highly birefringent optical waveguide may also be used in a pressure and temperature (PT) gauge or other Bragggrating-based sensors to eliminate the polarization dependence and increase measurement stability.

Figure 5:
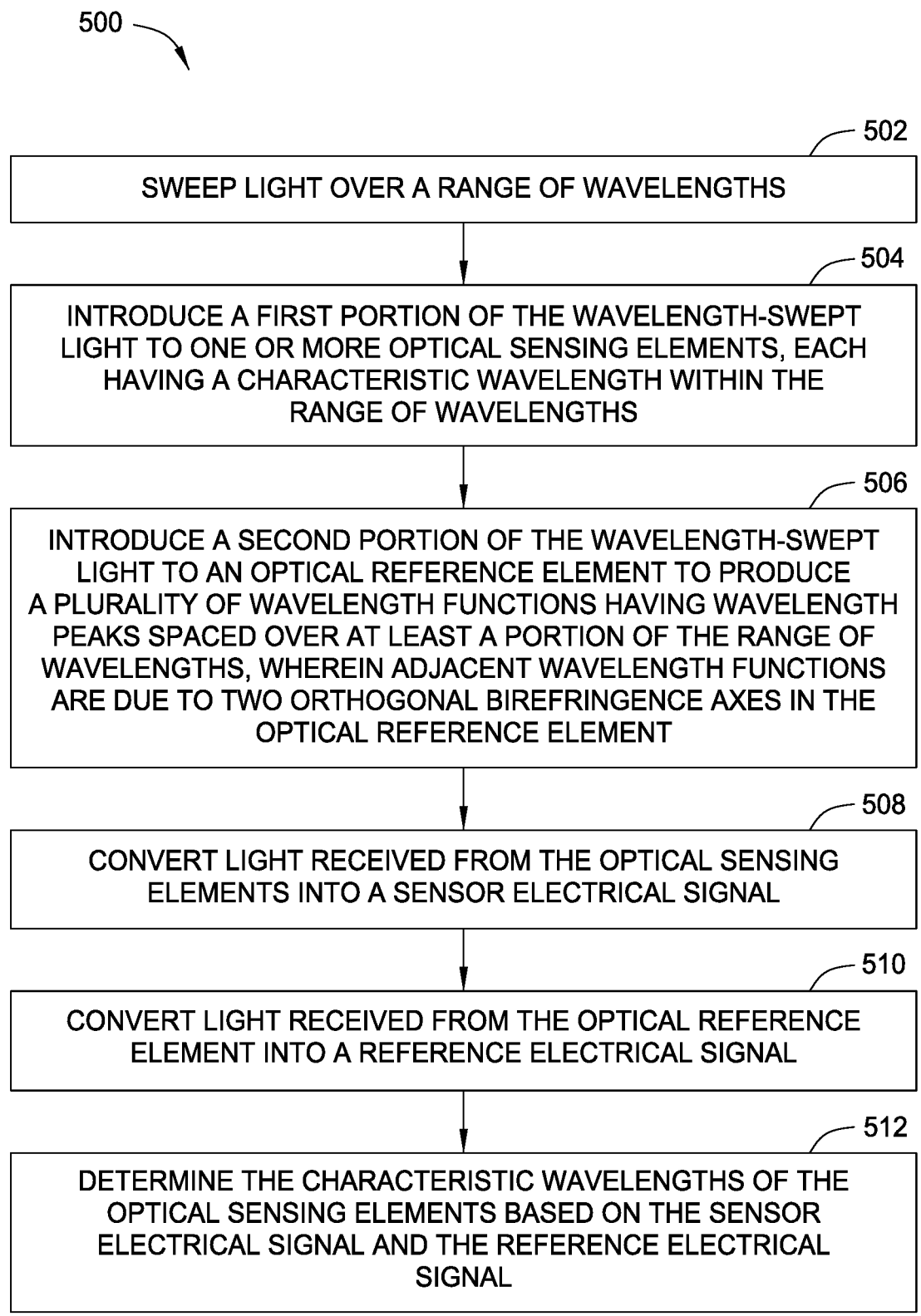
FIG. 5 is a flow diagram of example operations for determining characteristic wavelengths of one or more optical sensing elements, in accordance with certain aspects of the present disclosure.

FIG. 5 is a flow diagram of example operations 500 for determining characteristic wavelengths of one or more optical sensing elements, in accordance with aspects of the present disclosure. The operations 500 may be performed, for example, by an optical sensing system, such as the system 400 of FIG. 4.

The operations 500 may begin, at block 502, with the system sweeping light over a range of wavelengths. At block 504, the system (and more specifically, the directional coupler 404, for example) may introduce a first portion of the wavelength-swept light to the optical sensing elements, each having a characteristic wavelength within the range of wavelengths. At block 506, the system (e.g., the directional coupler 404) may introduce a second portion of the wavelength-swept light to an optical reference element (e.g., birefringent grating element 410) to produce a plurality of wavelength functions having wavelength peaks spaced over at least a portion of the range of wavelengths, wherein adjacent wavelength functions are due to two orthogonal birefringence axes in the optical reference element. At block 508, the system (and more specifically, the sensor receiver 414, for example) may convert light received from the optical sensing elements into a sensor electrical signal. At block 510, the system (and more specifically, the reference receiver 420, for example) may convert light received from the optical reference element into a reference electrical signal. At block 512, the system (and more specifically, the signal processing unit 422, for example) may determine the characteristic wavelengths of the optical sensing elements based on the sensor electrical signal and the reference electrical signal.

According to certain aspects, each of the wavelength peaks is pre-characterized for absolute wavelength over a range of environmental operating conditions for the optical reference element.

According to certain aspects, edges of the adjacent wavelength functions do not significantly overlap.

According to certain aspects, the adjacent wavelength functions are distinguishable over a range of environmental operating conditions for the optical reference element.

According to certain aspects, the optical reference element includes a core, a stress feature configured to generate the two orthogonal birefringence axes for light propagated in the core, and a cladding surrounding the core and the stress feature. In this case, an outer diameter of the cladding may be at least 0.3 mm. For certain aspects, the stress feature has an elliptical shape in cross-section. For certain aspects, the stress feature comprises two holes in the cladding; the two holes may be parallel to the core, for example. For certain aspects, the stress feature comprises two glass rods disposed in the cladding and parallel to the core. In this case, the two glass rods may have a thermal expansion coefficient different from a thermal expansion coefficient of the cladding. The core comprises a super-structured Bragg grating in certain aspects.

According to certain aspects, the wavelength peaks are uniformly spaced over the at least the portion of the range of wavelengths at a particular temperature and pressure.

According to certain aspects, at least one of the optical sensing elements includes a birefringent sensing element (e.g., as described in commonly owned U.S. Pat. No. 6,931, 188 to Kersey et al., entitled "Side-Hole Cane Waveguide Sensor").

As used herein, the term "determining" encompasses a wide variety of actions. For example, "determining" may include calculating, computing, processing, deriving, and the like. As used herein, a phrase referring to "at least one of" a list of items refers to any combination of those items, including single members.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Any of the operations described above, such as the operations 500, may be included as instructions in a computer-readable medium for execution by a (surface) controller for controlling the wavelength sweep (e.g., a wavelength sweep controller), the signal processing unit 422, and/or any other processing system. The computer-readable medium may comprise any suitable memory or other storage device for storing instructions, such as read-only memory (ROM), random access memory (RAM), flash memory, an electrically erasable programmable ROM (EEPROM), a compact disc ROM (CD-ROM), or a floppy disk.

While the foregoing is directed to aspects of the present disclosure, other and further aspects of the disclosure may be devised without departing from the basic scope thereof, and the scope thereof is determined by the claims that follow.

The invention claimed is:

1. A reference optical sensor comprising a core with a modulated refractive index, wherein:
   in response to light introduced into the reference optical sensor, the modulated refractive index is configured to produce a wavelength spectrum comprising multiple pairs of wavelength functions having wavelength peaks spaced over a range of wavelengths;
   adjacent wavelength functions in each pair are due to two orthogonal birefringence axes resulting from anisotropic stress on the core of the reference optical sensor, wherein the anisotropic stress on the core is configured to produce distinct wavelength peaks attributed to each of the two orthogonal birefringence axes;
   the wavelength peaks from the multiple pairs of wavelength functions are uniformly spaced over at least a portion of the range of wavelengths at a particular temperature and pressure; and
   the refractive index of the core has a periodic modulation corresponding to the uniform spacing of the wavelength peaks from the multiple pairs of wavelength functions.

2. The reference optical sensor of claim 1, wherein edges of the adjacent wavelength functions do not significantly overlap.

3. The reference optical sensor of claim 1, wherein the adjacent wavelength functions are distinguishable over a range of environmental operating conditions for the reference optical sensor.

4. The reference optical sensor of claim 1, further comprising:
   a stress feature configured to generate the two orthogonal birefringence axes for light propagated in the core; and
   a cladding surrounding the core and the stress feature.

5. The reference optical sensor of claim 4, wherein an outer diameter of the cladding is at least 0.3 mm.

6. The reference optical sensor of claim 4, wherein the stress feature has an elliptical shape in cross-section.

7. The reference optical sensor of claim 4, wherein the stress feature comprises two holes in the cladding and wherein the two holes are parallel to the core.

8. The reference optical sensor of claim 4, wherein the stress feature comprises two glass rods disposed in the cladding and parallel to the core and wherein the two glass rods have a thermal expansion coefficient different from a thermal expansion coefficient of the cladding.

9. The reference optical sensor of claim 4, wherein the core comprises a super-structured Bragg grating.

10. The reference optical sensor of claim 4, wherein edges of the adjacent wavelength functions do not significantly overlap.

11. The reference optical sensor of claim 4, wherein the adjacent wavelength functions are distinguishable over a range of environmental operating conditions for the reference optical sensor.

12. The reference optical sensor of claim 4, wherein one or more of the wavelength peaks are characterized for absolute wavelength over a range of environmental operating conditions for the reference optical sensor.

13. The reference optical sensor of claim 1, wherein one or more of the wavelength peaks are characterized for absolute wavelength over a range of environmental operating conditions for the reference optical sensor.

14. The reference optical sensor of claim 1, wherein the core comprises a super-structured Bragg grating.

15. The reference optical sensor of claim 1, further comprising a cladding surrounding the core, wherein an outer diameter of the cladding is at least 0.3 mm.

16. A reference optical sensor, wherein:
in response to light introduced into one core of the reference optical sensor, a modulated refractive index of the core is configured to produce a wavelength spectrum comprising multiple pairs of wavelength functions having wavelength peaks spaced over a range of wavelengths;
adjacent wavelength functions in each pair are due to two orthogonal birefringence axes in the reference optical sensor;
the wavelength peaks from the multiple pairs of wavelength functions are uniformly spaced over at least a portion of the range of wavelengths at a particular temperature and pressure; and
the refractive index of the core has a periodic modulation corresponding to the uniform spacing of the wavelength peaks from the multiple pairs of wavelength functions.

17. The reference optical sensor of claim 16, wherein the two orthogonal birefringence axes result from anisotropic stress on the core of the reference optical sensor and wherein the anisotropic stress on the core is configured to produce distinct wavelength peaks attributed to each of the two orthogonal birefringence axes.

18. The reference optical sensor of claim 16, further comprising:
a stress feature configured to generate the two orthogonal birefringence axes for light propagated in the core; and
a cladding surrounding the core and the stress feature.

19. The reference optical sensor of claim 18, wherein the stress feature has an elliptical shape in cross-section.

20. The reference optical sensor of claim 18, wherein the stress feature comprises two holes in the cladding and wherein the two holes are parallel to the core.

21. The reference optical sensor of claim 1, wherein a position of each of the wavelength peaks over the range of wavelengths is independent of a polarization state of the light introduced into the reference optical sensor.

22. The reference optical sensor of claim 1, wherein at least four wavelength peaks are uniformly spaced over the at least the portion of the range of wavelengths, the at least four wavelength peaks being from at least two different pairs of wavelength functions.

* * * * *